US011794641B2

(12) United States Patent
Spoor et al.

(10) Patent No.: US 11,794,641 B2
(45) Date of Patent: Oct. 24, 2023

(54) SYSTEM AND METHOD FOR ROADWAY USER SAFETY

(71) Applicants: Ryk E. Spoor, Troy, NY (US); David J. Metacarpa, Charlton, NY (US); Zahid F. Mian, Loudonville, NY (US)

(72) Inventors: Ryk E. Spoor, Troy, NY (US); David J. Metacarpa, Charlton, NY (US); Zahid F. Mian, Loudonville, NY (US)

(73) Assignee: International Electronic Machines Corp.

( * ) Notice: Subject to any disclaimer, the term of this patent is extended or adjusted under 35 U.S.C. 154(b) by 0 days.

(21) Appl. No.: 17/825,046

(22) Filed: May 26, 2022

(65) Prior Publication Data

US 2022/0379806 A1    Dec. 1, 2022

Related U.S. Application Data

(60) Provisional application No. 63/193,226, filed on May 26, 2021.

(51) Int. Cl.
*B60Q 1/50* (2006.01)
*B60Q 1/00* (2006.01)

(52) U.S. Cl.
CPC .......... *B60Q 1/545* (2022.05); *B60Q 1/0023* (2013.01); *B60Q 1/525* (2013.01); *B60Q 2400/50* (2013.01)

(58) Field of Classification Search
CPC ...... B60Q 1/545; B60Q 1/0023; B60Q 1/525; B60Q 2400/50
See application file for complete search history.

(56) References Cited

U.S. PATENT DOCUMENTS

| | | | | |
|---|---|---|---|---|
| 9,896,107 B1* | 2/2018 | Huang | ............... | B60W 10/184 |
| 9,969,325 B2* | 5/2018 | Lection | ............... | G08G 1/167 |
| 10,134,280 B1* | 11/2018 | You | ............... | B60Q 1/525 |
| 10,220,769 B1* | 3/2019 | Dellock | ............ | G08G 1/096783 |
| 10,272,830 B2* | 4/2019 | Suzuki | ............... | G08G 1/005 |
| 10,300,846 B2* | 5/2019 | Suzuki | ............... | B60Q 1/04 |
| 10,308,172 B2* | 6/2019 | Suzuki | ............... | G08G 1/005 |
| 10,311,718 B2* | 6/2019 | Suzuki | ............... | B60Q 1/525 |
| 10,457,199 B2* | 10/2019 | Kunii | ............... | B60Q 1/54 |
| 10,647,248 B2* | 5/2020 | Kunii | ............... | B60Q 1/38 |
| 10,696,223 B2* | 6/2020 | Morel | ............... | G06V 20/56 |
| 10,794,719 B2* | 10/2020 | Kunii | ............... | G01C 21/365 |
| 10,796,580 B2* | 10/2020 | Dellock | ............... | B60Q 1/00 |
| 10,845,020 B2* | 11/2020 | Kurashige | ......... | G02B 27/4222 |
| 11,100,805 B2* | 8/2021 | Salter | ............... | G08G 1/09623 |

(Continued)

*Primary Examiner* — Hoi C Lau

(57) ABSTRACT

A system, a method, and a computer program product may be provided for user guidance. In an example, the system includes an image projection device configured to project traffic patterns on a surface, at least one non-transitory memory configured to store computer program code, and a processor configured to execute the computer program code to control operation of the image projection device. For example, sensor data from one or more sensors onboard a vehicle is obtained. The sensor data is associated with a state of operation of the vehicle, and proximate movement associated with the vehicle. Based on the sensor data, one or more traffic patterns for projection is determined. Further, an image projection device is controlled to project the one or more traffic patterns in one or more direction of the vehicle.

16 Claims, 8 Drawing Sheets

(56) References Cited

U.S. PATENT DOCUMENTS

| | | | | |
|---|---|---|---|---|
| 11,247,605 B2* | 2/2022 | Kunii | | H04N 9/3179 |
| 11,249,341 B2* | 2/2022 | Kunii | | B60Q 1/50 |
| 11,340,089 B2* | 5/2022 | Kunii | | B60Q 1/08 |
| 11,480,854 B2* | 10/2022 | Camras | | H05B 45/20 |
| 11,530,792 B2* | 12/2022 | Kurashige | | G03H 1/22 |
| 2003/0147247 A1* | 8/2003 | Koike | | B60Q 9/004 |
| | | | | 362/464 |
| 2007/0280503 A1* | 12/2007 | Kubota | | B60Q 1/50 |
| | | | | 382/103 |
| 2009/0013922 A1* | 1/2009 | Lin | | B60Q 1/38 |
| | | | | 116/28 R |
| 2012/0044090 A1* | 2/2012 | Kahler | | B60Q 1/50 |
| | | | | 340/905 |
| 2014/0028980 A1* | 1/2014 | Othmer | | B60Q 1/50 |
| | | | | 353/14 |
| 2015/0203023 A1* | 7/2015 | Marti | | B60W 30/10 |
| | | | | 340/425.5 |
| 2015/0298598 A1* | 10/2015 | Nüssli | | B60Q 1/2665 |
| | | | | 345/2.2 |
| 2016/0031366 A1* | 2/2016 | White | | B60Q 1/503 |
| | | | | 353/121 |
| 2016/0167648 A1* | 6/2016 | James | | B60Q 1/503 |
| | | | | 701/28 |
| 2016/0207448 A1* | 7/2016 | Galicia Badillo | | B60J 5/06 |
| 2017/0080850 A1* | 3/2017 | Drexler | | B60Q 1/085 |
| 2017/0144591 A1* | 5/2017 | Yatsu | | H04N 9/3185 |
| 2017/0182934 A1* | 6/2017 | Arita | | B60Q 1/50 |
| 2018/0004020 A1* | 1/2018 | Kunii | | G03B 21/14 |
| 2018/0086262 A1* | 3/2018 | Morel | | G06V 10/60 |
| 2018/0118095 A1* | 5/2018 | Kunii | | B60Q 1/1423 |
| 2018/0118099 A1* | 5/2018 | Kunii | | B60Q 1/38 |
| 2018/0126897 A1* | 5/2018 | Hamada | | B60Q 1/50 |
| 2019/0061611 A1* | 2/2019 | Dellock | | B60Q 1/2665 |
| 2019/0066509 A1* | 2/2019 | Dellock | | G08G 1/163 |
| 2019/0066510 A1* | 2/2019 | Salter | | G01C 21/3602 |
| 2019/0248277 A1* | 8/2019 | Kunii | | B60Q 1/547 |
| 2019/0389368 A1* | 12/2019 | Yasuda | | B60Q 1/346 |
| 2020/0063938 A1* | 2/2020 | Kurashige | | F21S 41/285 |
| 2020/0088379 A1* | 3/2020 | Kurashige | | F21V 14/06 |
| 2020/0207261 A1* | 7/2020 | Camras | | B60Q 1/085 |
| 2020/0231085 A1* | 7/2020 | Kunii | | B60Q 1/503 |
| 2020/0249043 A1* | 8/2020 | Salter | | B60Q 1/543 |
| 2021/0041076 A1* | 2/2021 | Kurashige | | G02B 5/0252 |
| 2021/0229597 A1* | 7/2021 | Dellock | | B60Q 1/543 |
| 2021/0341304 A1* | 11/2021 | Kunii | | B60Q 1/1423 |
| 2021/0370823 A1* | 12/2021 | Stein | | B60Q 1/507 |
| 2022/0024376 A1* | 1/2022 | Shmueli Friedland | | B60Q 1/50 |
| 2022/0118902 A1* | 4/2022 | Kunii | | H04N 9/3179 |
| 2022/0121048 A1* | 4/2022 | Kunii | | B60Q 1/04 |
| 2022/0244066 A1* | 8/2022 | Kunii | | B60Q 1/525 |
| 2022/0350155 A1* | 11/2022 | Nakabayashi | | G02B 27/0179 |
| 2022/0379806 A1* | 12/2022 | Spoor | | B60Q 1/525 |
| 2023/0041578 A1* | 2/2023 | Hamamoto | | F21S 43/195 |

* cited by examiner

SYSTEM AND METHOD FOR ROADWAY USER SAFETY

REFERENCE TO RELATED APPLICATIONS

This application claims priority to and the benefit of U.S. Provisional Patent Application No. 63/193,226, filed on 26 May 26, 2021, and which is hereby incorporated by reference.

TECHNOLOGICAL FIELD

The present disclosure generally relates to road safety systems, and more particularly relates to systems and methods for road safety and user guidance by projecting a pattern for a pedestrian crossing.

BACKGROUND

Pedestrians, specifically, school children, need guidance and supervision when walking near traffic. As children move actively or impulsively and are often unaware of dangers associated with traffic, they may be more prone to fatalities or injuries associated with the traffic. Typically, fatalities or injuries among young pedestrians occur more often during the after school hours, such as boarding or exiting a school bus.

As may be understood, a large number of school busses are operational during school year. During each day of the school year, the school buses make multiple stops along their route to pick up or drop passengers, such as students, including very young children. In certain cases, the school buses may light certain signage or traffic signal to indicate a passenger or student getting on or off the bus. However, drivers frequently pass a stopped bus illegally. To this end, standard law enforcement fails to reduce such illegal passing. In certain cases, drivers may be bad actors or inattentive of any signage indicating stopped bus for passengers getting on or off the bus. As a result, there may be huge risk of safety of passengers, specifically, children getting on and off of a bus.

This leads to serious safety concerns due to huge threat to life and limb; specifically as standard law enforcement does not work to reduce such illegal passing, because they are not due to a small number of bad actors who might be intimidated or educated into being more careful, but to simple distraction and inattentiveness on the part of drivers. This danger is exacerbated due to the fact that most pick up-drop off points are not standard crosswalks; they are often simply a point along a road near or at the point where a child or children live, and thus have no visible sign to indicate that children may frequently be crossing.

Thus, there is a need to overcome the safety related challenges discussed above, and to provide reliable and safe user guidance in all traffic conditions, specifically for pick-up and drop-off from a vehicle, such as a bus.

BRIEF SUMMARY

The present disclosure described is intended to address serious safety issues currently seen in the intersection of pedestrian crossings and traffic, particularly with respect to school buses and children crossing the road, either boarding or leaving the bus, who are endangered by inattentive or impatient motorists who pass the bus despite its flashing lights and stop signs. Currently there are no specific and practical solutions addressing this issue, which combines challenges of understanding (knowing when and exactly where children may be crossing), attentiveness (recognizing and acting upon the fact that a bus has stopped and is in the process of taking on or unloading passengers), and action (how to address the prior two challenges in a physically, psychologically, and economically effective and practical manner).

Accordingly, a system, a method, and a computer program product are provided herein that focuses on providing user guidance. In one aspect, the system for user guidance may be provided. The system may include an image projection device configured to project traffic patterns on a surface; at least one non-transitory memory configured to store computer program code; and at least one processor (hereinafter referred as processor) configured to execute the computer program code to control operation of the image projection device. In accordance with an embodiment, the processor may be configured to obtain sensor data from one or more sensors onboard a vehicle. The sensor data is associated with a state of operation of the vehicle, and proximate movement associated with the vehicle. In accordance with an embodiment, the processor may be configured to determine one or more traffic patterns for projection, based on the sensor data. In accordance with an embodiment, the processor may be configured to control the image projection device to project the one or more traffic patterns in one or more direction of the vehicle.

According to some example embodiments, the processor may be further configured to determine a crosswalk for projection, based on sensor data indicating at least one of inactive motion of the vehicle at a designated stop location, movement of one or more passenger associated with the vehicle, and activated stop indicator of the vehicle. In accordance with an embodiment, the processor may be further configured to control the image projection device to project the crosswalk on a road surface at a pre-defined distance in a first direction.

According to some example embodiments, the first direction of projecting the crosswalk is at a front side of the vehicle.

According to some example embodiments, the activated stop indicator indicates halt of the vehicle when a passenger associated with the vehicle is, one of getting on the vehicle and getting off the vehicle.

According to some example embodiments, the processor may be further configured to monitor traffic proximate to the vehicle during the projection of the crosswalk on the road surface, based on sensor data indicating the proximate movement associated with the vehicle.

According to some example embodiments, the processor may be further configured to determine an approaching vehicle during the projection of the crosswalk on the road surface, based on the monitoring. In accordance with an embodiment, the processor may be further configured to determine a stop sign for projection based on the approaching vehicle; and control the image projection device to project the stop sign on a road surface in one or more directions.

According to some example embodiments, the one or more directions for projecting the stop sign is at least one of a front side of the vehicle, a first side of the vehicle, a second side of the vehicle, a rear of the vehicle.

According to some example embodiments, the one or more directions for projecting the stop sign is a direction from which the approaching vehicle is approaching.

According to some example embodiments, the traffic patterns being projected by the image projection device include at least one of a crosswalk, a stop sign, a slow sign, one or more traffic sign, and one or more text.

According to some example embodiments, the image projection device includes a plurality of projectors, the plurality of projectors being mounted on one or more sides of the vehicle.

According to some example embodiments, the plurality of projectors include a first projector mounted on a front side of the vehicle, a second projector mounted on a first side of the vehicle, a third projector mounted on a second side of the vehicle, and a fourth projector mounted on a rear side of the vehicle.

According to some example embodiments, the plurality of projectors are configured to project different traffic patterns.

Embodiments disclosed herein may provide a method for user guidance. The method may include obtaining sensor data from one or more sensors onboard a vehicle. The sensor data being associated with a state of operation of the vehicle, and proximate movement associated with the vehicle. The method may include determining one or more traffic patterns for projection, based on the sensor data. The method may include controlling an image projection device to project the one or more traffic patterns in one or more direction of the vehicle.

According to some example embodiments, the method may further include determining a crosswalk for projection, based on sensor data indicating at least one of inactive motion of the vehicle at a designated stop location, movement of one or more passenger associated with the vehicle, and activated stop indicator of the vehicle. In accordance with an embodiment, the method may further include controlling the image projection device to project the crosswalk on a road surface at a pre-defined distance in a first direction.

According to some example embodiments, the method may further include determining an approaching vehicle during the projection of the crosswalk on the road surface, based on sensor data indicating the proximate movement associated with the vehicle. In accordance with an embodiment, the method may further include determining a stop sign for projection based on the approaching vehicle and controlling the image projection device to project the stop sign on a road surface in one or more directions.

According to some example embodiments, the image projection device includes a plurality of projectors, the plurality of projectors being mounted on one or more sides of the vehicle. In accordance with an embodiment, the method may further include controlling a first projector mounted on a front side of the vehicle to project the crosswalk on the road surface at a predetermined distance for a pre-defined time period, controlling a second projector mounted on a first side of the vehicle to project the stop sign, controlling a third projector mounted on a second side of the vehicle to project the stop sign, and controlling a fourth projector mounted on a rear side of the vehicle to project the stop sign.

Embodiments of the present disclosure may provide a computer programmable product including at least one non-transitory computer-readable storage medium having computer-executable program code stored therein. The computer programmable product comprising a non-transitory computer readable medium having stored thereon computer executable instructions, which when executed by a computer, cause the computer to carry out operations, for user guidance. The operations include obtaining sensor data from one or more sensors onboard a vehicle. The sensor data being associated with a state of operation of the vehicle, and proximate movement associated with the vehicle. The operations include determining one or more traffic patterns for projection, based on the sensor data. The operations include controlling an image projection device to project the one or more traffic patterns in one or more direction of the vehicle. Further provided is a computer program product comprising instructions which, when the program is executed by a computer, cause the computer to carry out any of the steps described herein.

According to some example embodiments, the operations include determining a crosswalk for projection, based on sensor data indicating at least one of inactive motion of the vehicle at a designated stop location, movement of one or more passenger associated with the vehicle, and activated stop indicator of the vehicle. In accordance with an embodiment, the operations may further include controlling the image projection device to project the crosswalk on a road surface at a pre-defined distance in a first direction.

According to some example embodiments, the operations include determining an approaching vehicle during the projection of the crosswalk on the road surface, based on sensor data indicating the proximate movement associated with the vehicle. In accordance with an embodiment, the operations may further include determining a stop sign for projection based on the approaching vehicle and controlling the image projection device to project the stop sign on a road surface in one or more directions.

According to some example embodiments, the image projection device comprises a plurality of projectors, the plurality of projectors being mounted on one or more sides of the vehicle. In accordance with an embodiment, the operations include controlling a first projector mounted on a front side of the vehicle to project the crosswalk on the road surface at a predetermined distance for a pre-defined time period and controlling a second projector mounted on a first side of the vehicle to project the stop sign, wherein the first side of the vehicle is in a direction from which the approaching vehicle is approaching.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
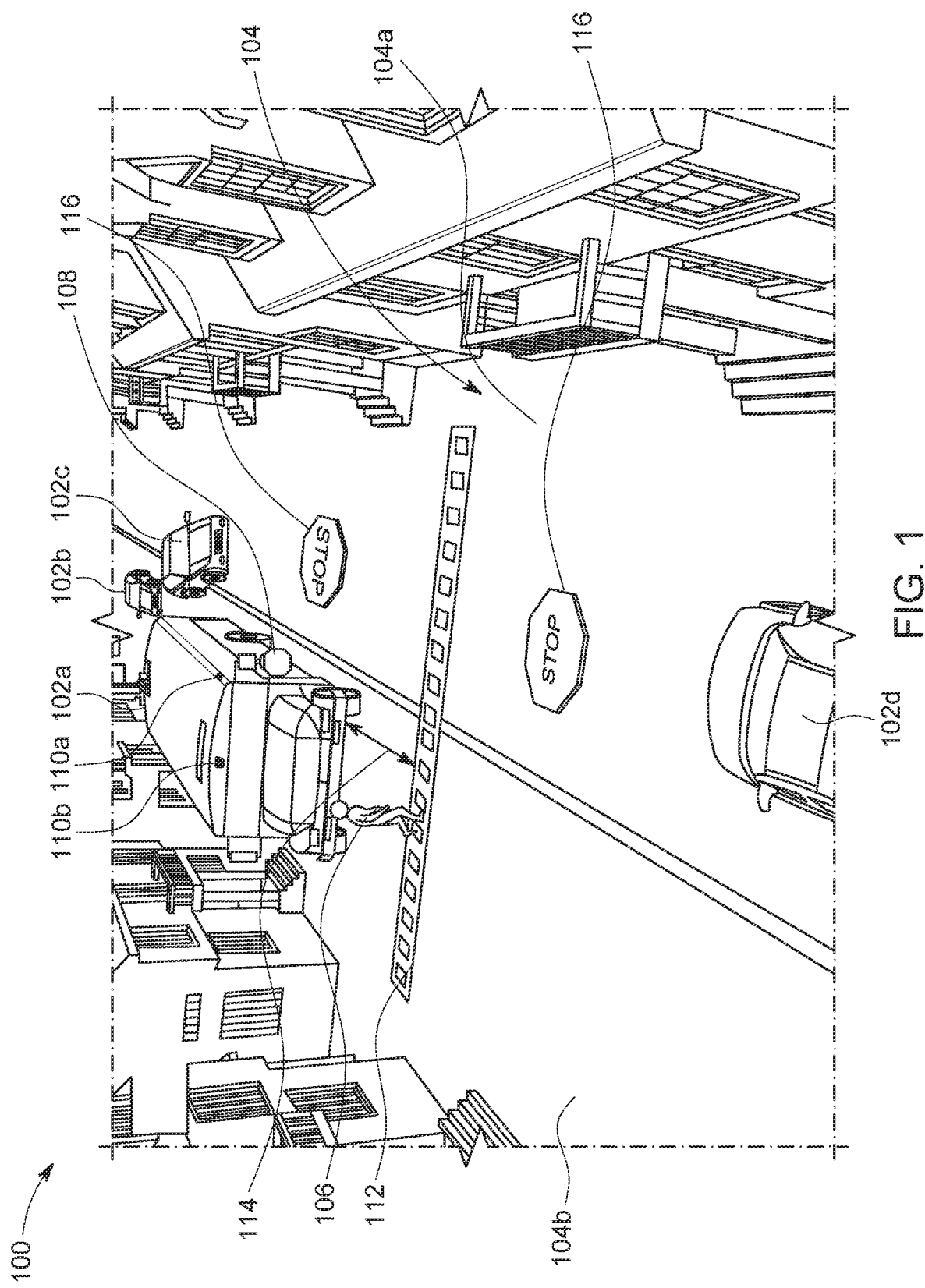
Figure 2:
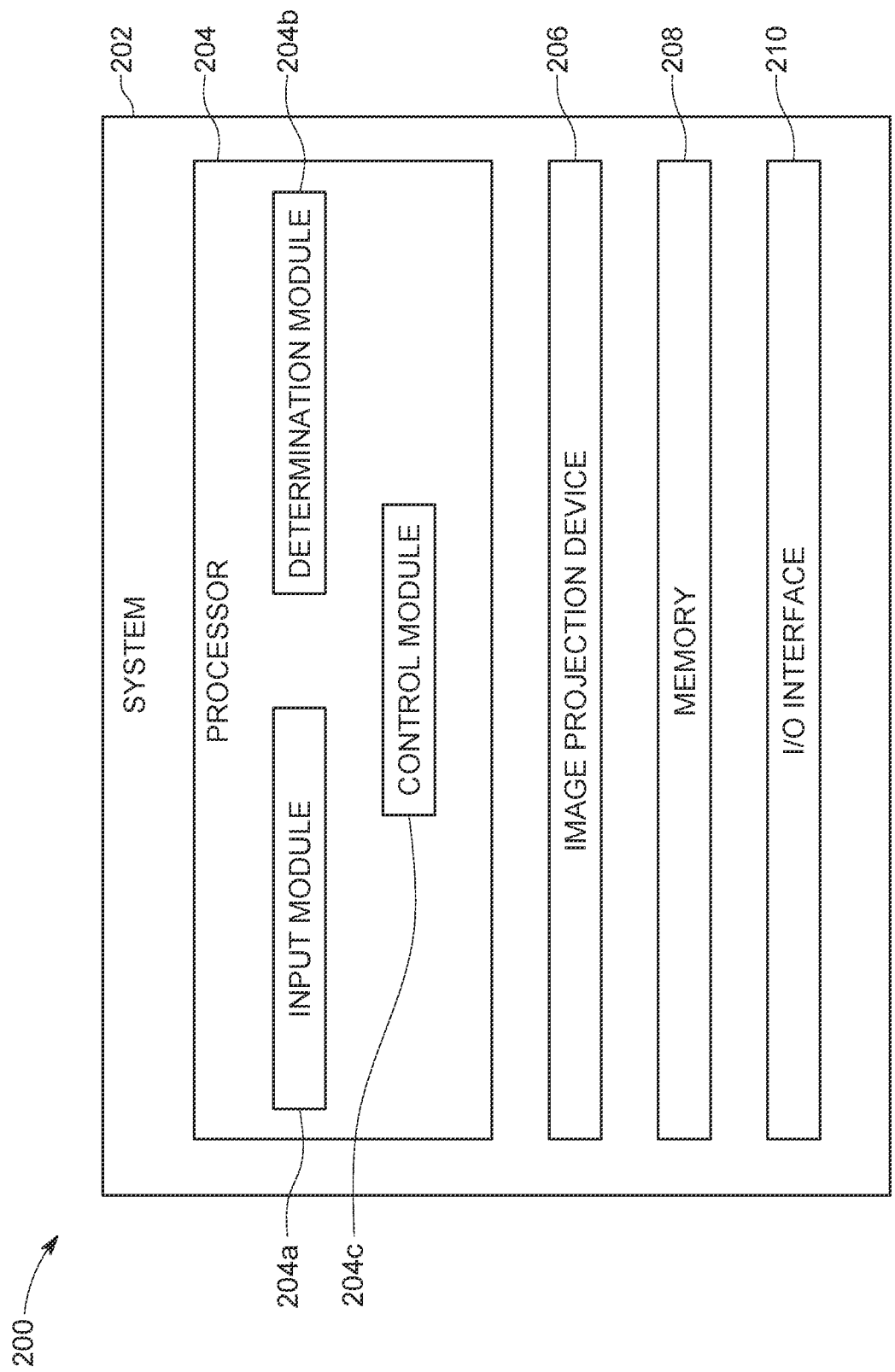
Figure 3A:
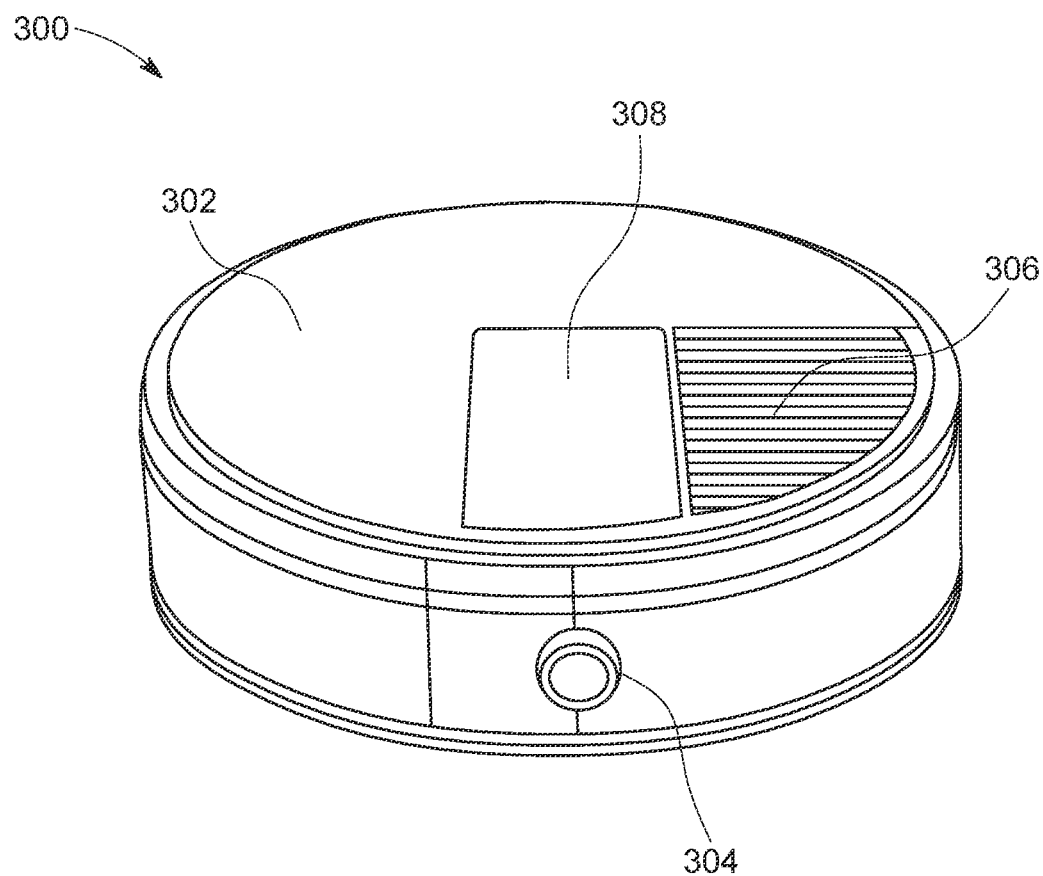
Figure 3B:
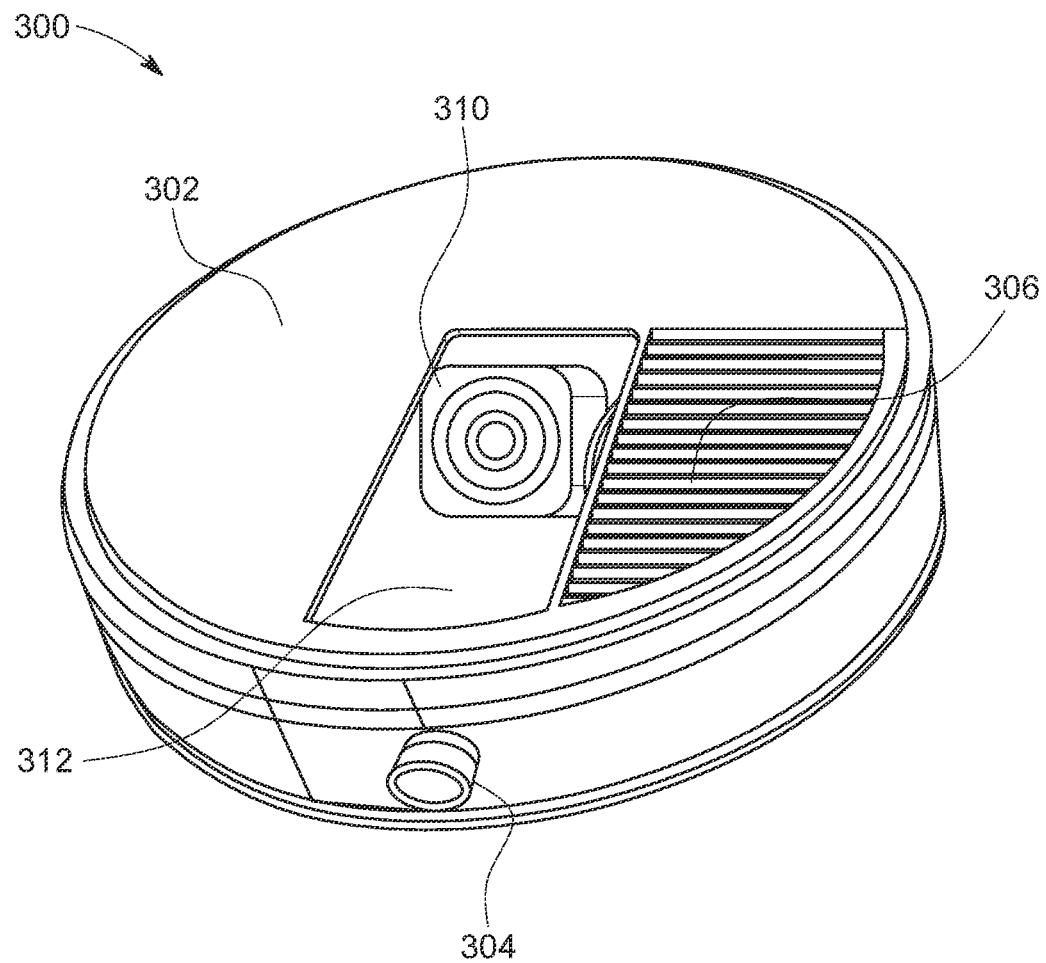
Figure 3C:
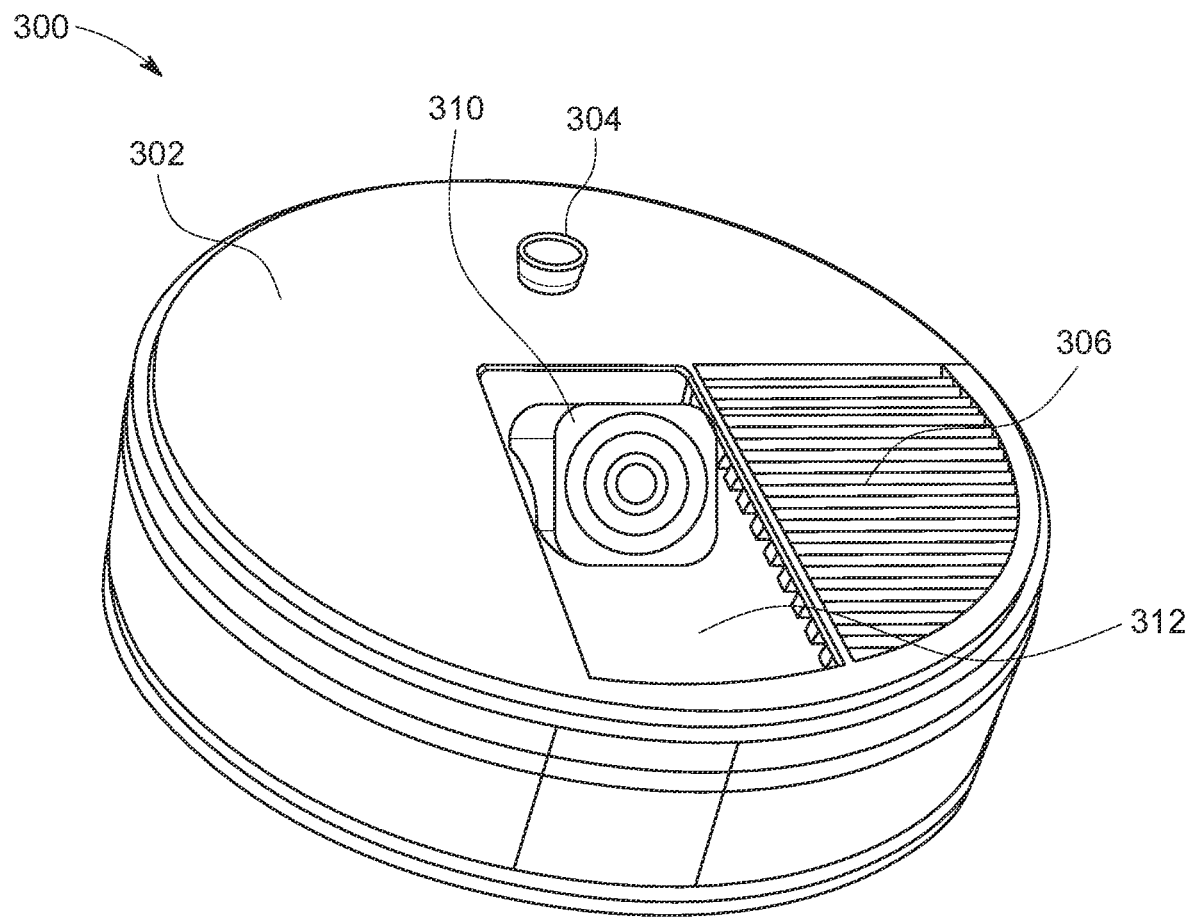
Figure 4:
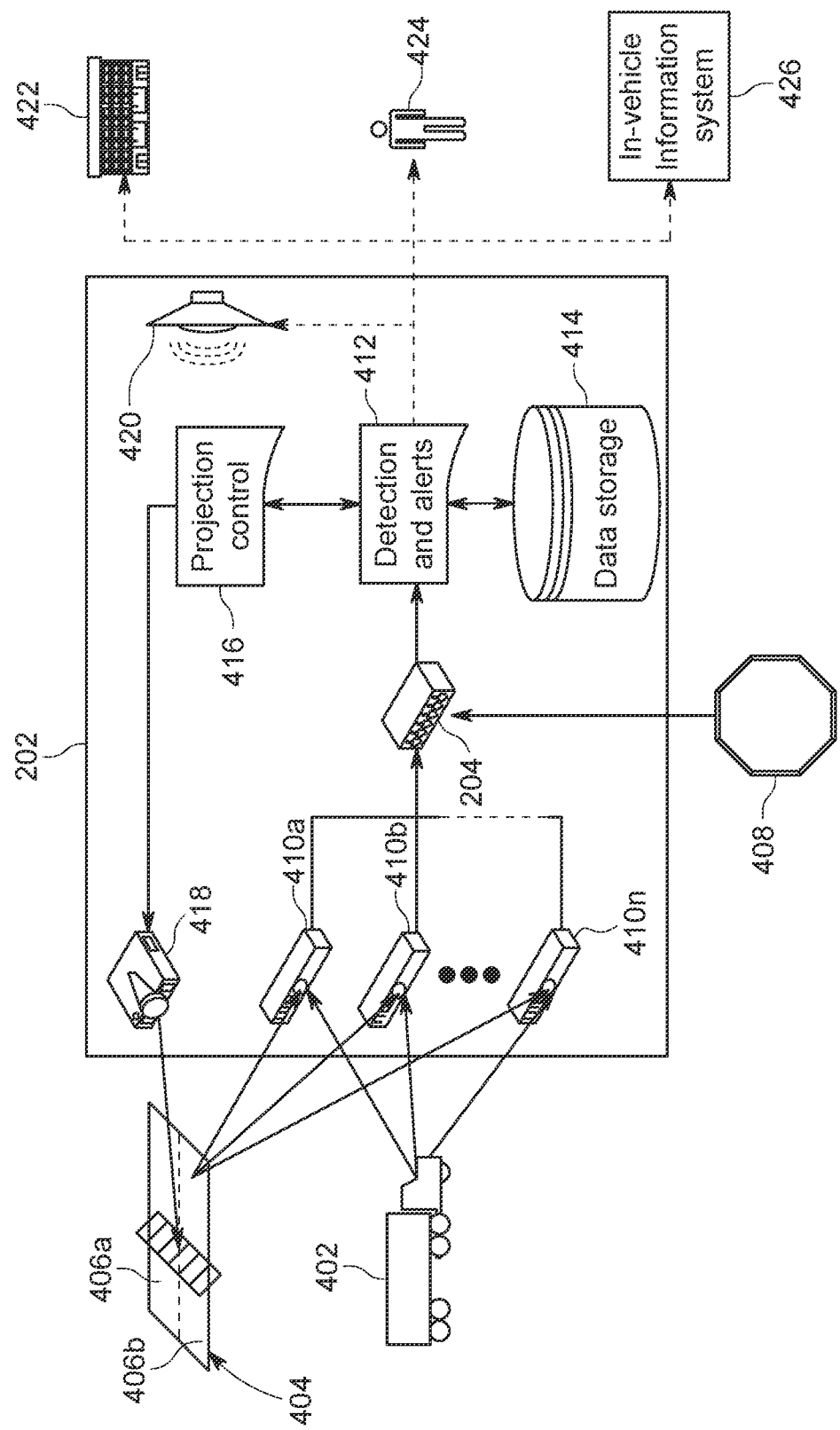
Figure 5:
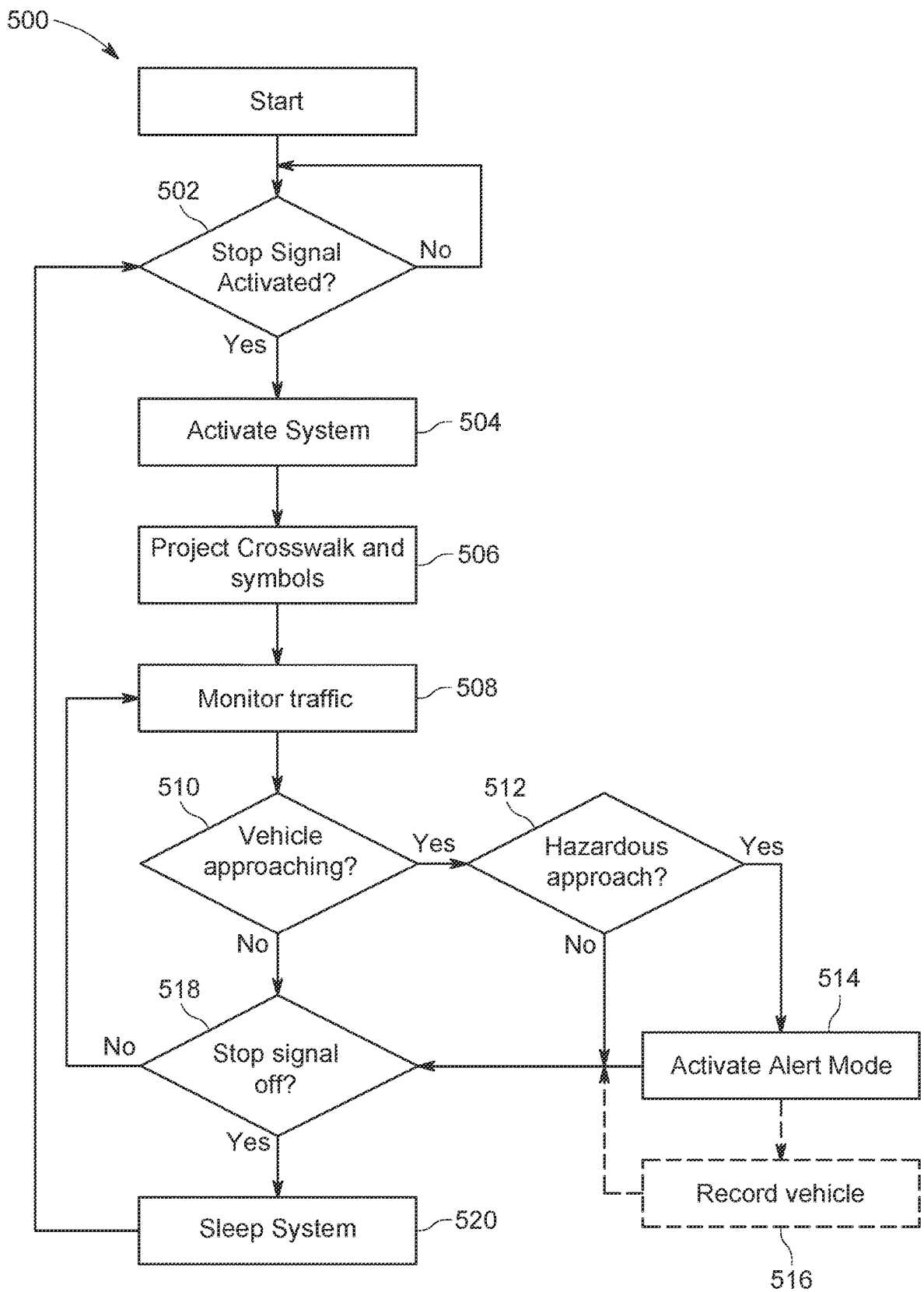
Figure 6:
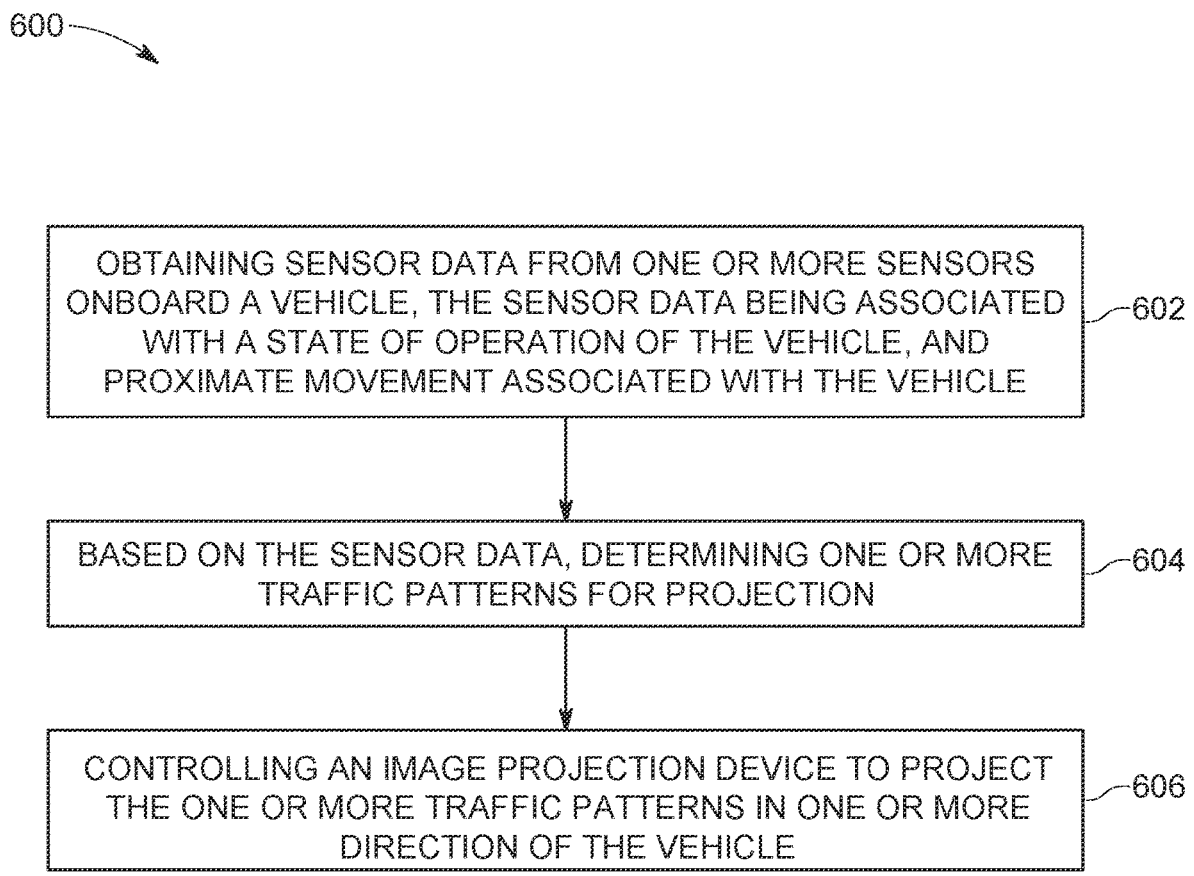

Having thus described example embodiments of the disclosure in general terms, reference will now be made to the accompanying drawings, which are not necessarily drawn to scale, and wherein:

FIG. 1 illustrates a network environment of a system implemented for user guidance, in accordance with an example embodiment;

FIG. 2 illustrates a block diagram of a system for user guidance, in accordance with an example embodiment;

FIGS. 3A-3C illustrate an exemplary projection device for projecting traffic patterns, in accordance with various example embodiments;

FIG. 4 illustrates an exemplary network environment in which a system for user guidance is implemented, in accordance with an example embodiment;

FIG. 5 illustrates an example method for user guidance, in accordance with an example embodiment; and FIG. 6 illustrates an example method for user guidance, in accordance with another example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" may refer to a way leading a traveler from one location to another. The road may have a single lane or multiple lanes.

The term "lane" may refer to a part of a road that is designated for travel of vehicles or pedestrians as per some condition.

The term "traffic pattern" may refer to signage to provide instructions and/or information to road users. In an example, the traffic pattern may include simplified and standardized pictorial signs to enhance traffic safety. For example, the pictorial signs may symbol to provide traffic or road related information or instruction. In an example, the traffic pattern may be a traffic sign. In another example, the traffic pattern may include plurality of traffic signs. In yet another example, the traffic pattern may include certain addition information, such as text, along with traffic signs. Examples of the traffic pattern may include, but are not limited to, danger signs (for example, chemical storage area danger, falling hazard danger, high voltage danger, electric shock hazard, restricted area danger, etc.), warning signs (for example, slippery road, stop sign ahead, left or right turn ahead, merging traffic, no passing zone, etc.), regulatory signs (for example, stop, give way, one way, no entry, prohibition for right turn, prohibition for left turn, vehicle width limit, vehicle speed limit, etc.), guide signs (for example, crosswalk patterns, route markers, destination signs, mile posts, service information, recreational and cultural interest area, etc.), prohibitory signs (for example, no parking, no halting, no horn, no U-turn, no right turn, no left turn, etc.), direction, position or indication sign (for example, roundabout, distance left to destination, way to destination, driver location signs, highway number, exit number, etc.), and school signs (for example, school zone, school crossing, school bus stop ahead, pedestrian crosswalk ahead, slow, stop, watch out for children, etc.).

End of Definitions

A system, a method, and a computer program product are provided herein in accordance with an example embodiment for user guidance. The system, the method, and the computer program product disclosed herein enables a user, specifically, a pedestrian to safely cross a road. Specifically, the system, the method, and the computer program product disclosed herein projects a crosswalk on a road surface to guide a pedestrian to cross a road safely while ensuring that traffic from other sides of road is managed or halted.

The system, the method, and the computer program product disclosed herein may be configured to determine whether a passenger is getting off or getting on a vehicle. For example, the vehicle may be a bus. Subsequently, the system, the method, and the computer program product disclosed herein may be configured to display a traffic pattern to guide the passenger for boarding and/or debarking the vehicle. In particular, the system, the method, and the computer program product disclosed herein may be configured to display different traffic patterns, for example, a crosswalk, one or more stop signs, one or more warning signs, and so forth, in different directions. This may help a passenger (also referred to, as a pedestrian) to crossroad while ensuring safety of the pedestrian. The system, the method, and the computer program product disclosed herein enables identification of an exact location that may be used by a pedestrian for crossing a road, i.e., on a projected crosswalk. The system, the method, and the computer program product disclosed herein monitors traffic proximate to the projected crosswalk. In this manner, the system, the method, and the computer program product disclosed herein recognizes inattentive drivers that may try to cross a stopped vehicle or the projected crosswalk. The system, the method, and the computer program product disclosed herein provides secure crosswalk for crossing a road safely and addresses inattentive or negligent drivers that may try to illegally cross the projected crosswalk in economical, effective, and practical manner.

In one example, the system described in the present disclosure may include an image projection device and a processor. The system may be mounted to a vehicle. The image projection device may be capable of projecting a traffic pattern, and the processor may control a time of activation of the projector. In one example, the image projection device, when activated, may be configured to generate and/or project a crosswalk at an appropriate position and distance from the vehicle to enable safe crossing of a road on which the vehicle is situated. Pursuant to present disclosure, the vehicle may be a school bus, and the passengers getting off or getting on may be students or children. For example, when the bus is stopped for loading or unloading passengers, i.e., children, the processor disclosed herein may detect that children are to cross a road. Subsequently, the processor may activate the image projection device to project a bright and contrasting color crosswalk in front of the bus, at a safe distance, extending across the road to be crossed. In addition, the system may also monitor traffic proximate to the bus, for example, by monitoring lanes in both directions. Further, the system may be configured to project additional traffic patterns, such as warning signs, on a surface ahead of vehicles that are determined to be approaching towards the projected crosswalk. Further, the system may also be configured to alert the approaching vehicle by audible warnings or other in-vehicle alerting systems.

The system, the method, and the computer program product disclosed herein may be configured to provide user guidance for crossing a road. The system, the method, and the computer program product disclosed herein may project a crosswalk when a passenger deboards vehicle. The system, the method, and the computer program product disclosed herein may further monitor traffic proximate to the vehicle and the projected crosswalk. The system, the method, and the computer program product disclosed herein may further project traffic patterns, such as warning signs, stop signs, and so forth, to alert vehicles approaching towards the projected crosswalk. These and other technical improvements of the present disclosure will become evident from the description provided herein.

FIG. 1 illustrates a network environment 100 of a system implemented for user guidance, in accordance with an example embodiment. As shown in FIG. 1, the network environment 100 may include vehicles (depicted as vehicles 102a, 102b, 102c, 102d, and collectively referred to as vehicles 102) travelling on a road 104. In particular, the road 104 may have two lanes 104a and 104b. The vehicles 102 may include one or more sensors, a user equipment and/or a communication interface (not shown in the FIG. 1). The network environment 100 further includes a pedestrian 106. In an example, pedestrian 106 may be a passenger that may have deboarded the vehicle 102a. As shown in FIG. 1, the vehicle 102a is a bus. Pursuant to present example, the vehicle 102a may be a school bus and the pedestrian 106 may be a child.

It may be noted that the road 104 having two lanes 104a and 104b should not be construed as a limitation. In other examples of the present disclosure, the road 104 may have more lanes, such as four lanes, six lanes, and so forth. In addition, the number of vehicles 102 on the road 104 may be higher or lower. Further, a number of pedestrians on the road 104 is not limited to one. In other embodiments, the number of pedestrians on the road and/or crossing the road may be more.

Continuing with present example, the vehicle 102a (also referred to as school bus or bus 102a) may stop on the road 104. During stopping, the bus 102a may indicate that it has stopped for boarding or debarking of children, and the bus 102a transports children to or from a school. In particular, the bus 102a may light a stop indicator 108 to indicate to traffic that a child or children may be boarding or debarking the bus 102a. In certain cases, a child or the children may have to cross the road 104 to reach to the bus 102a or to go towards their stops. Accordingly, drivers of other vehicles (such as, vehicles 102b, 102c, and 102d) on the road 104 may slow down or stop their vehicles to let the children pass through or cross the road 104.

However, despite several signage indicating the stopped bus 102a and passenger or children boarding or debarking the bus, for example, via stop indicator 108, certain drivers may illegally try to pass the stopped bus 102a. As shown in FIG. 1, vehicle 102c may try to pass the bus 102a. In addition, the vehicle 102d may also move towards a path that may be used by a child or children to cross a road for debarking or onboarding the bus 102a. To this end, wrongdoers or inattentive drivers on the road may overlook a child crossing the road. In certain cases, the children may not understand the severity of road safety and move in a careless manner on the road. As a result, an inattentive driver may find it difficult to deal with sudden movements of children on the road. This may pose serious danger to life and limb of the child. This danger is exacerbated due to the fact that most of stop locations, i.e., pick-up locations and/or drop-off locations are not standard bus stops. As the stop locations of bus, specially, school bus lie along a road or at a point where a child or children live, such stop locations may not have visible signs to indicate that children may be frequently crossing.

The problems relating to road safety of children is further worsened due to children not having a clear path to use for safely crossing the road. For example, the children may move in any pattern, such as around rear of the bus, in front of the bus, diagonally across the road, and so forth. To this end, without any guidelines on how to cross the road, the children may tend to take, for example, a shortest path towards their destination or home. These factors may further increase potential of road hazard of children.

Furthermore, in certain cases, visibility of road may be poor, for example, due to fog, heavy rain, cloudiness, darkness, etc. In such cases, the drivers of other vehicles may fail to see the pedestrians or children crossing the road. In such cases, the threat to life and limb of the children may further increase. Therefore, there is a need to overcome the aforementioned technical problems and alert drivers on roads to overcome distraction and inattentiveness, thereby ensuring safety of children from any fatal injuries or hazards.

Returning to present example, the vehicle 102a, i.e., the school bus 102a may include a processor (not shown in FIG. 1) and an image projection device for projecting a traffic pattern. The image projection device may be mounted on exteriors of the vehicle 102a. In particular, the image projection device may include a plurality of projectors (depicted as projectors 110a and 110b, and collectively referred to as projectors 110). The projectors 110 may be positioned on different sides of the bus 102a. As shown in FIG. 1, the projector 110a is mounted at a side of the bus 102a and the projector 102b is mounted at front of the bus 102a.

Additional, fewer, or different components may be provided in the network environment 100. For example, a server, a router, a switch or intelligent switch, a database, additional computers or workstations, administrative components, such as an administrative workstation, a gateway device, a backbone, ports, network connections, and network interfaces may be provided. While the components in FIG. 1 are shown as separate from one another, one or more of these components may be combined. In this regard, the processor of the system for user guidance may be communicatively coupled to the components shown in FIG. 1 to carry out the desired operations and wherever required modifications may be possible within the scope of the present disclosure.

In an example embodiment, the system (not shown in FIG. 1) for user guidance may be onboard the bus 102*a*, such as the system may be a guidance or alert system installed in the bus 102*a* for projecting a crosswalk, monitoring traffic, and generating and/or projecting alerts to ensure safety. In an example, the bus 102*a* may be an autonomous vehicle, a semiautonomous vehicle, or a manually operated vehicle. In another example embodiment, the system may be operated autonomously, semi-autonomously, or manually. For example, the system may be embodied as a cloud based service, a cloud based application, a cloud based platform, a remote server based service, a remote server based application, a remote server based platform, or a virtual computing system. In yet another example embodiment, the system may be an OEM (Original Equipment Manufacturer) cloud. The OEM cloud may be configured to anonymize any data received by the system, such as from the bus 102*a*, before using the data for further processing, such as before sending the data to a database.

The system may be communicatively coupled to the bus 102*a*, or any other platform, via a network. In an embodiment, the system may be communicatively coupled to other components, for example, user equipment, and so forth, not shown on FIG. 1 via the network. The network may be wired, wireless, or any combination of wired and wireless communication networks, such as cellular, Wi-Fi, internet, local area networks, or the like. In some embodiments, the network may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

All the components in the network environment 100 may be coupled directly or indirectly to the network. The components described in the network environment 100 may be further broken down into more than one component and/or combined together in any suitable arrangement. Further, one or more components may be rearranged, changed, added, and/or removed.

In some example embodiments, the system for user guidance may be coupled to the bus 102*a*, via a user equipment. In an embodiment, the system may be coupled to one or more user equipment, for example, as a part of an in-vehicle guidance system, a guidance app in a mobile device and the like. The user equipment may be any user accessible device such as an in-built user device, a mobile phone, a smartphone, a portable computer, and the like that are portable in themselves or as a part of another portable/mobile object such as the bus 102*a*. The user equipment may comprise one or more sensors, a processor, a memory, and a communication interface. The processor, the sensors, the memory, and the communication interface may be communicatively coupled to each other. In some example embodiments, the user equipment is associated, coupled, or otherwise integrated with the bus 102*a* as, for example, an advanced driver assistance system (ADAS), a personal device (PND), a portable device, an infotainment system and/or other device that may be configured to provide user guidance and navigation related functions to users/drivers. For example, the user equipment may be configured to execute and run mobile applications such as a messaging application, a browser application, a navigation application, and the like.

In one embodiment, the bus 102*a* may be consumer vehicle and may be a beneficiary of the services provided by the system. In some example embodiments, the bus 102*a* may serve the dual purpose of data gatherers and beneficiary devices. In an example, the bus 102*a* may be configured to detect vehicle conditions, road conditions, and traffic conditions on links and/or roads by using sensors that are on-board the bus 102*a*. In another example, a user equipment within the bus 102*a* may be configured to gather sensor data using sensors on-board the bus 102*a* and/or sensors of the user equipment. The user equipment then sends the detected data to the system, which processes the detected data to determine a stop, project a traffic pattern, monitor traffic, and generate alerts for other vehicles on the road.

The system may comprise suitable logic, circuitry, and interfaces that may be configured to provide guidance for crossing a road and generating alert or warning based on monitoring of traffic. The system includes the processor and the image projection device. As mentioned before, the image projection device includes one or more projectors 110*a* and 110*b*. The processor is configured to control the projectors 110*a* and 110*b* of the image projection device.

In certain embodiments, the system may be coupled to a map database (not shown in FIG. 1). The map database may comprise suitable logic, circuitry, and interfaces that may be configured to store sensor data, traffic data and map data, which may be collected from vehicles. In an example, the system may receive the sensor data, map data and traffic data and fuse the data to infer traffic-related information and road conditions associated with the road 104 in which probes or fleeting vehicles 102 are moving. In accordance with an embodiment, the sensor data may be updated in real time or near real time such as within a few seconds, a few minutes, or on hourly basis, to provide accurate and up to date data.

In operation, when the bus 102*a* stops at the road 104, the stop indicator 108 is turned on. In an example, the stop indicator 108 may be turned on automatically or manually to indicate that the bus 102*a* is halted for unloading or loading a passenger. In accordance with present example, the projector 110*b* is attached at front of the bus 102*a* and the projector 110*a* is attached at a side of the bus 102*a* facing other lane (a lane on which the bus is not halted) 104*a* of the road 104. In an example, the pedestrian or the child 106 may have to cross the road to other side of the road. In this regard, the processor may be configured to obtain sensor data from one or more sensors onboard the bus 102a. The sensor data may be associated with a state of operation of the bus 102a, and proximate movement associated with the bus 102a. In an example, the state of operation of the bus 102a may indicate halt of the bus 102a. In another example, the state of operation of the bus 102a may indicate activation of the stop indicator 108 of the bus 102a. In yet another example, the state of operation of the bus 102a may indicate opening of door of the bus 102a for onboarding or debarking of passenger. Furthermore, the proximate movement associated with the bus may indicate traffic movement, i.e., movement of other vehicles such as, vehicle 102b, 102c, and 102d that are proximate to the bus 102a.

Once obtained, the processor may be configured to determine one or more traffic patterns for projection, based on the sensor data. In an example, on determining, based on the sensor data, that the stop indicator 108 is turned on (or activated) and a passenger has deboarded or boarded the bus 102a and the passenger has to cross the road 104, i.e., move from lane 104b to 104a, the processor may determine a crosswalk to be projected. In addition, the processor may also determine certain other signs, for example, stop sign, children ahead, drive slowly, etc. to be projected to ensure safety of the pedestrian or child 106 crossing the road 104.

Thereafter, the processor may control the image projection device to project the one or more traffic patterns in one or more direction of the bus 102a. In an example, the processor may control the image projection device to cause to project the crosswalk 112 using the projector 110b such that the crosswalk 112 is projected in front of the bus 102a. In addition, the processor ensures that the crosswalk 112 is projected at a predetermined safe distance 114 from the bus 102a. In an example, the predetermined distance 114 may be ten feet, twelve feet, fifteen feet, and so forth, away from the bus 102a. The crosswalk 112 projected by the projector 110b may guide the child or pedestrian 106 and indicate to the drivers of vehicles 102b, 102c and 102d where people or pedestrian 106 may be expected to cross thereby indicting them to slow down or stop and allow the pedestrian 106 to cross. To this end, the projected crosswalk 112 may be easily detectable or visible at a range. Subsequently, the crosswalk 112 mat be recognized or seen in time for drivers of vehicles on the road 104 to respond, and subsequently, slow or stop to let pedestrian 106 cross the road 104.

It may be noted that use of two projectors at two sides of the bus 102a is only illustrative. In other embodiments of the present disclosure, the image projection device may include a greater number of projectors, for example, other projectors at other sides of the bus 102a, more than one projector at a same side of the bus 102a, or a combination thereof. In accordance with an example embodiment, the processor may be configured to operate the stop indicator 108 and the image projection device together. In such a case, the processor may activate the stop indicator 108 and further project the crosswalk 112 using the projector 110b.

In accordance with an embodiment, the processor may be further configured to monitor traffic proximate or surrounding to the bus 102a based on sensor data. In some example embodiments, sensors on-board the bus 102a may generate sensor data, based on movement of other vehicles surrounding the bus 102a and movement of the bus 102a. In accordance with an embodiment, the sensor data may be generated when sensor(s) on-board the bus 102a may sense that warning conditions are met or satisfied. In accordance with an embodiment, the warning conditions may be predefined based on, for example, state of operation of the bus 102a, movement of vehicles proximate to the bus 102a. In an example, a warning condition may be defined as a state when the bus 102a is stopped, the stop indicator 108 is activated, the image processing device is projecting the crosswalk 112, and one or more vehicles are trying to cross the bus 102a and/or is approaching towards the projected crosswalk. The sensors may generate the sensor data in real-time and transmit it to the processor to report the warning condition. In certain cases, the sensors may be configured to generate updated sensor data periodically, for example, every five seconds, every thirty seconds, every minute, and so forth, in case of detection of hazardous conditions. For example, motion sensors, inertia sensors, image capture sensors, proximity sensors, LIDAR (light detection and ranging) sensors, and ultrasonic sensors may be used to collect the sensor data.

Pursuant to present example, the vehicles 102c is attempting to pass the bus 102a. Such attempt may be detected by the processor, based on sensor data. Subsequently, based on determination of such attempt to pass, the processor may cause the projector 110a to project another traffic pattern. In an example, the traffic pattern is a stop sign 116. In particular, the stop sign 116 is projected on a surface of the road 104 to alert the driver of the vehicle 102c. In addition, the processor may also detect the vehicle 102d to be in motion and moving towards the projected crosswalk 112, based on sensor data. Subsequently, the processor may cause the projector 110a to project the stop sign 116 in front of the vehicle 102d. In certain cases, the color, brightness, and/or flashing rate of the stop sign 116 may be varied to draw attention of the drivers. To this end, the vehicle 102b is detected to be properly stationed behind the bus 102a. Thus, the vehicle 102b may not be registered as threat and no stop sign may be required for the vehicle 102b. To this end, by projecting the warning sign, i.e., the stop sign 116, the system may escalate warning for an unsafely approaching vehicle. The sensor data may or not be recorded or stored for further use.

FIG. 2 illustrates a block diagram 200 of a system 202 that may be used for user guidance for crossing a road, in accordance with an example embodiment. FIG. 2 is explained in conjunction with FIG. 1.

The system 202 may include at least one processor 204, an image projection device 206, a memory 208, and an I/O interface 210. The at least one processor 204 may comprise modules, depicted as an input module 204a, a determination module 204b, and a control module 204c.

In accordance with an embodiment, the system 202 may store data that may be generated by the modules while performing corresponding operation or may be retrieved from a database associated with the system 202. In an example, the data may include sensor data, map data, traffic data, probe data, vehicle data, a plurality of traffic patterns, one or more traffic pattern to be projected, and warning message.

The image projection device 206 may be an optical configured to project an image or a moving image onto a surface. Pursuant to present example, the image projection device 206 may include one or more projectors. Each of the projectors may be configured to project an image onto a road surface or a pavement. In an example, the projectors may be mounted on a vehicle. For example, one or more projectors may be mounted on a front side of the vehicle, one or more projectors may be mounted on a rear side of the vehicle, one or more projectors may be mounted on a first side (for example, right side) of the vehicle, and one or more projector may be mounted on a second side (for example, left side) of the vehicle. In an example, the projectors of the image projection device 206 may be controlled by a controller. For example, a projector may be controlled to project a traffic pattern, for example, by shining a light through a small transparent lens, or by using lasers. In an example, different projectors may be controlled to project same or different traffic patterns.

The input module 204a may be configured to obtain input data for processing. In accordance with an embodiment, the input data may include, for example, sensor data, map data, vehicle data, traffic data, and probe data. In an example, the input module 204a may be configured to obtain sensor data from a database associated with the system 202 and/or sensors onboard the vehicle. Examples of sensor data may include, but are not limited to, speed data, location data, inertia data, surrounding images, proximity or surrounding vehicle data, and LIDAR data. In an example, the sensor data may be obtained from one or more sensors onboard the vehicle in real-time. For example, vehicle data may include, but is not limited to, vehicle dimensions, vehicle registration information, vehicle location, vehicle motion, features of vehicle, passenger(s) associated with the vehicle, and state of operation of vehicle.

Based on the input data obtained by the input module 204a, the determination module 204b may determine a traffic pattern for projection. In an example, the determination module 204b may process the input data to generate operating information. In an example, the determination module 204b may determine that a passenger may be onboarding or debarking the vehicle when the vehicle is halted, i.e., there is no acceleration or speed, a stop indicator of the vehicle is turned on, a location of the vehicle indicates a stop location, a door of the vehicle may be opened, imaging device of the vehicle indicates a debarking or approaching passenger(s), designated stop location information, and passenger information. For example, the activated stop indicator of the vehicle indicates halt of the vehicle when a passenger associated with the vehicle is getting on the vehicle and/or getting off the vehicle. Based on the operating information, the determination module 204b may determine that a crosswalk is to be projected to guide a pedestrian to board or deboard the vehicle securely.

In an example, the determination module 204b may determine another traffic pattern for projection, based on input data including sensor data, map data, traffic data, vehicle data, and probe data. In this regard, the determination module 204b may monitor traffic of surrounding area for safety of pedestrian crossing on the crosswalk, while projecting the crosswalk. For example, based on the input data, the determination module 204b may determine whether other vehicle is trying to pass or cross the stopped vehicle, other vehicle is moving towards the projected crosswalk, distance of such other vehicle from the stopped vehicle, and speed of such other vehicle. Based on the determination, the determination module 204b may determine that a warning sign and/or warning message is to be projected to warn driver of the other vehicle regarding approaching crosswalk where pedestrian may be crossing.

Further, the control module 204c may be configured to control the image projection device 206. In an example, the control module 204c may trigger or activate the image projection device, based on the determination made by the determination module 204b. In an example, based on a determined traffic pattern to be projected, the control module 204c may determine which projector of the one or more projectors of the image projection device 206 may have to be activated. For example, when a traffic pattern to be projected is the crosswalk, the control module 204c may determine that a projector at the front or rear of the stopped vehicle may have to be activated. Subsequently, the control module 204c may activate or trigger the projector at the front or the rear of the stopped vehicle.

In accordance with an example, when a traffic pattern to be projected is the warning sign, the control module 204c may identify a direction of the other approaching vehicle or a direction of the other vehicle trying to pass the stopped vehicle, and distance of such other vehicle. Subsequently, the control module 204c may control projectors facing in direction of such other vehicle to project the warning sign. In an example, the other vehicle may be trying to pass the stopped vehicle from its rear and further towards left side of the stopped vehicle. In such a case, the control module 204c may trigger or activate one or more projectors at rear side and left side of the stopped vehicle to project a warning sign or any other warning message. In another example, the other vehicle may be approaching towards the projected crosswalk from an opposite direction of the stopped vehicle, i.e., from front of the stopped vehicle towards left side of the stopped vehicle. In such a case, the control module 204c may trigger or activate one or more projectors at front side and/or left side of the stopped vehicle to project the warning sign or the warning message. In an example, the warning sign may be a stop sign, a slow sign, a pedestrian crossing sign, a children ahead sign, a caution sign, and so forth. In certain cases, a warning message may also be projected. For example, the warning message may be a text, such as 'children crossing ahead', 'school children', 'watch out for the children', 'school bus stop', 'stop for crosswalk', 'pedestrians are crossing', 'go slow', 'stop', and so forth.

In accordance with an embodiment, the processor 204 may also store the received input data corresponding to the stopped vehicle and one or more other vehicle surrounding the stopped vehicle within a map database along with corresponding processed information.

The processor 204 may retrieve computer executable instructions that may be stored in the memory 208 for execution of the computer executable instructions. The memory 208 may store the received input data associated with the stopped vehicle. In accordance with an embodiment, the processor 204 may be configured to retrieve input data (such as, real-time sensor data, historical probe data, real-time probe data, map data indicating map attributes associated with plurality of links and intersections, vehicle data, and traffic data) from background batch data services, streaming data services or third party service providers, and renders output, such as, the traffic pattern to be projected for user guidance for use by the end user through the I/O interface 210.

The processor 204 may be embodied in a number of different ways. For example, the processor 204 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 204 may include one or more processing cores configured to perform independently. A multi-core processor may enable multiprocessing within a single physical package. Additionally or alternatively, the processor 204 may include one or more processors configured in tandem via the bus to enable independent execution of instructions, pipelining and/or multithreading. Additionally or alternatively, the processor 204 may include one or more processors capable of processing large volumes of workloads and operations to provide support for big data analysis. In an example embodiment, the processor 204 may be in communication with the memory 208 via a bus for passing information among components of the system 202.

The memory 208 may be non-transitory and may include, for example, one or more volatile and/or non-volatile memories. In other words, for example, the memory 208 may be an electronic storage device (for example, a computer readable storage medium) comprising gates configured to store data (for example, bits) that may be retrievable by a machine (for example, a computing device like the processor 204). The memory 208 may be configured to store information, data, content, applications, instructions, or the like, for enabling the system 202 to carry out various functions in accordance with an example embodiment of the present disclosure. For example, the memory 208 may be configured to buffer input data for processing by the processor 208. As exemplarily illustrated in FIG. 2, the memory 208 may be configured to store instructions for execution by the processor 204. As such, whether configured by hardware or software methods, or by a combination thereof, the processor 204 may represent an entity (for example, physically embodied in circuitry) capable of performing operations according to an embodiment of the present disclosure while configured accordingly. Thus, for example, when the processor 204 is embodied as an ASIC, FPGA or the like, the processor 204 may be specifically configured hardware for conducting the operations described herein.

Alternatively, as another example, when the processor 204 is embodied as an executor of software instructions, the instructions may specifically configure the processor 204 to perform the algorithms and/or operations described herein when the instructions are executed. However, in some cases, the processor 204 may be a processor specific device (for example, a mobile terminal or a fixed computing device) configured to employ an embodiment of the present disclosure by further configuration of the processor 204 by instructions for performing the algorithms and/or operations described herein. The processor 204 may include, among other things, a clock, an arithmetic logic unit (ALU) and logic gates configured to support operation of the processor 204. The network environment, such as, 100 may be accessed using the I/O interface 210 of the system 202. The I/O interface 210 may provide an interface for accessing various features and data stored in the system 202.

The processor 204 of the system 202 may be configured to obtain sensor data from one or more sensors onboard the vehicle. The sensor data may be associated with a state of operation of the vehicle and proximate movement associated with the vehicle. Further, based on the sensor data, the processor 204 may determine one or more traffic patterns for projection. The processor 204 may further control the image projection device 206 to project the one or more traffic patterns in one or more direction of the vehicle.

The memory 208 of the system 202 may be configured to store a dataset (such as, but not limited to, the sensor data, the plurality of traffic patterns, the vehicle data, the traffic data, the probe data, and the map data) associated with the multiple links that may be travelled by the vehicle, such as links on a route of the vehicle. In accordance with an embodiment, the memory 208 may include processing instructions for processing sensor data. The dataset may include real-time sensor data and historical sensor data, from service providers and onboard sensors.

In some example embodiments, the I/O interface 210 may communicate with the system 202 and displays input and/or output of the system 202. As such, the I/O interface 210 may include a display and, in some embodiments, may also include a keyboard, a mouse, a joystick, a touch screen, touch areas, soft keys, one or more microphones, a plurality of speakers, or other input/output mechanisms. In one embodiment, the system 202 may comprise user interface circuitry configured to control at least some functions of one or more I/O interface elements such as a display and, in some embodiments, a plurality of speakers, a ringer, one or more microphones and/or the like. The processor 204 and/or I/O interface 210 circuitry comprising the processor 204 may be configured to control one or more functions of one or more I/O interface 210 elements through computer program instructions (for example, software and/or firmware) stored on a memory 208 accessible to the processor 204. The processor 204 may further render notification associated with the user guidance, such as crosswalk, warning sign, warning message, etc., on a user equipment or audio or display onboard the vehicles via the I/O interface 210.

In some embodiments, the processor 204 may be configured to provide Internet-of-Things (IoT) related capabilities to users of the system 202 disclosed herein. The IoT related capabilities may in turn be used to provide smart city solutions by providing real time warnings, big data analysis, and sensor-based data collection by using the cloud based mapping system for providing accurate user guidance and ensuring safety. The I/O interface 210 may provide an interface for accessing various features and data stored in the system 202.

FIGS. 3A-3C illustrate an exemplary projection device 300 for projecting traffic patterns, in accordance with various example embodiments. It may be noted that the construction of the projection device 300 illustrated in FIGS. 3A-3C is only illustrative and should not be construed as a limitation. In other embodiments of the present disclosure, different construction of projector may exist. In an example, the projection device 300 may be a part of the image projection device 206 or may be the image projection device 206 itself.

The projection device 300 includes a housing 302 for enclosing other components of the projection device 300. The housing 302 may provide support and protection to the other components.

In accordance with present example, the projection device 300 includes at least one sensor (depicted as sensor 304). In an example, the sensor 304 may be configured to detect an approaching vehicle. For example, the sensor 304 may be an imaging device, a radar, a LIDAR, or any other means to detect and recognize moving vehicles. Pursuant to present example, the sensor 304 may be an imaging device. Examples of the imaging device may include, but are not limited to, such as a still camera, a motion picture camera, a camcorder, or any other instrument, equipment, or format capable of recording, storing, or transmitting visual images of other objects or persons. In an example, the projection device 300 may include more than one sensor and a combination of one or more types of sensors. This many enable the projection device 300 to make accurate detection, make detection in multiple directions, and/or use in sensor fusion.

It may be noted that the sensor 304 may be positioned strategically in the projection device 300 to cover a large range of area surrounding the stopped vehicle and detect approaching vehicle reliably. For example, the sensor 304 may be positioned based on a location of mounting of the projection device 300 on the stopped vehicle, such as the bus 102a. To this end, it may be noted that sensor 304 or other sensors may be positioned and affixed in the projection device 300 in any manner that makes the sensor 304 effective in performing its operations. For example, a field of view or field of sensing of the sensor 304 may be very wide or narrow, for example, in a range of 1 meter to 20 meters, based on a desired coverage of the sensor 304.

In addition, the housing 302 of the projection device 300 may include a grill area 306. For example, the grill area 306 may enable heat dissipation from the projection device 300. In an example, the projection device 300 may also include a speaker (not shown in FIGS. 3A-3C). In such a case, the grill area 306 protects the speaker and while allowing sound to pass through the housing 302 clearly.

Further, the projection device 300 includes a projector 310 (shown in FIG. 3B and FIG. 3C) for projecting images. The projector 310 may be capable of projecting images, for example, traffic patterns, onto pavement or road surface. The projector 310 may project the traffic pattern with sufficient brightness to allow drivers to clearly see the projected traffic pattern. In an example, the projector may include a pan-tilt mechanism to adjust a direction and an angle of projection. For example, the projector 310 may use lasers, Light Emitting Diodes (LEDs), or any other means of projecting a pattern of light as needed.

As shown in FIGS. 3A and 3B, the sensor 304 may be positioned at a vertical side of the projection device 300. Further, as shown in FIG. 3C, the sensor 304 may be the sensor 304 may be positioned at a top side of the projection device 300.

As shown in FIG. 3A, the projector may be retracted or folded and covered by a protective door 308. In an example, the protective door 308 may be a sliding door that may cover an area in which the projector is positioned. For example, the area where the projector is positioned may have a cavity for positioning the projector at a level that is lower than a level of an outer surface of the housing 302. Subsequently, the projector may be folded and inserted into the cavity and the protective door 308 may be shut, when the projector is not in use. The protective door 308 may protect the projector by reducing exposure of the projector to outside elements, such as sun, rain, trees, electric lines, and so forth.

As shown in FIGS. 3B and 3C, the projector 310 may be uncovered. For example, the projector 310 may be uncovered when the processor 204 of the system 202 sends an instruction relating to projection of a traffic pattern. In particular, the traffic pattern to be projected may be determined by the processor 204. For example, an image of the traffic pattern to be projected may be communicated to the projector 310. Subsequently, the projector 310 may project the traffic pattern. In an example, the traffic pattern may be a crosswalk, a warning sign, a warning message, or a combination thereof. In an example, the projector 310 may be rugged and may not require protection. In such cases, the protective door may not be required For example, the projector 310 may be positioned in a cavity area 312 on the housing 302. Further, the projector 310 may be folded and retracted or inserted into the cavity area 312 when the not in use.

It may be noted that in certain cases, the projection device 300 may include only the projector. In such cases, sensors, such as the sensor 304, and speaker may be mounted on the stopped vehicle separately.

In certain cases, the processor 204 may also control the speaker in the projection device 300. In such a case, the processor 204 may control the speaker, i.e., activate the speaker to give, for example, an audio warning. The audio warning may further draw attention of drivers and warn them regarding crossing of crosswalk pedestrian, such as children.

FIG. 4 illustrates an exemplary network environment in which the system 202 for user guidance is implemented, in accordance with an example embodiment. Pursuant to present example, the system 202 may be configured to perform operations to provide guidance to passengers onboarding or debarking from a vehicle, such as the vehicle 102a or bus 102a. In an example, the bus 102a may be travelling along a route that includes the roadway area 404. Moreover, other vehicles 402 may also be travelling on the roadway area 404. The roadway area 404 may have two lanes 406a and 406b. For example, the lane 406a may be an up lane, while the lane 406b may be a down lane. To this end, a direction of traffic moving in the lane 406a may be opposite to a direction of traffic moving in the lane 406b. Moreover, the bus 102a may stop or halt at the roadway area 404, for example, for onboarding (or loading) or debarking (or unloading) of a child from the bus 102a.

In an example, the system 202 may receive input or input data for performing its operations. In an example, the input may include sensor data. For example, the sensor data may relate to the bus 102a, the roadway area 404, and other vehicle(s) 402 proximate to the bus 102a and within a region of interest. For example, the sensor data relating to the bus 102a may include state of operation of the bus 102a. In an example, the state of operation of the bus 102a may include motion of the bus 102a, acceleration or speed of the bus 102a, location of the bus 102a, status of a stop indicator 408 of the bus 102a, and so forth. It may be noted that the stop indicator 408 may be activated when a passenger may have to board the bus 102a or deboard the bus 102a, to indicate that the bus 102a has stopped for boarding or debarking of a passenger.

For example, the stop indicator 408 may be activated manually by a driver of the bus 102a or any other person associated with the bus 102a or may be activated automatically. In an example, the stop indicator 408 may be activated automatically, for example, when a location of the bus 102a corresponds to a designated stop location of the bus 102a, on determining that a passenger is approaching the bus 102a or getting off the bus 102a. For example, the passenger may be registered as a passenger associated with the bus 102a in case of frequent use of the bus 102a by the passenger. This may enable identification of the passenger and corresponding boarding and/or debarking location. Such boarding and/or debarking location may be set as stop locations for the bus 102a. In an example, the bus 102a may be a school bus. In such a case, the passenger may be a student. Subsequently, the student may be registered with a corresponding boarding and debarking location. In an example, the boarding location may be near house of the student and the debarking location may be school. In another example, the boarding location may be the school and the debarking location may be near the house. To this end, based on the registered boarding and debarking location, the stop indicator 408 may be activated.

For example, the sensor data may be obtained from sensors 410a-410n. The sensors 410a-410n may be onboard the bus 102a, and/or other data collection devices in the region of interest in the roadway area 404. In an example, the sensor data may be obtained from the sensors 410a-410n and passed to the processor 204. In an example, the processor 204 may be incorporated into the sensors and projection device described in FIGS. 3A-3C or be a separate system to which the sensors and the projection device are connected. In the case of multiple self-contained units, the processor 204 may be connected in a manner that permits reasonable synchronization of action with other components.

In an example, the processor 204 may include filters or other hardware or software means for eliminating noise from received sensor data before processing the sensor data for detection and alerting 412. In an example, the input module 204a of the processor 204 may be configured to filter the received sensor data. Moreover, the input module 204a may also be configured to access other data, such as map data, vehicle data, traffic data, and so forth from a database 414 and pass to the detection and alerting 412.

Continuing further, the detection and alerting 412 may be implemented by the detection module 204b. In an example, the detection and alerting 412 or the detection module 204b may be executed as a software, a hardware, a firmware, or a combination thereof. In an example, the detection module 204b may be a software or computer-executable instructions executed by the processor 204. The detection module 204b may be connected to the database 414 that may store data to enable the operation of the detection module 204b as well as may store any data generated by the detection module 204b. In an example, the detection module 204b may store data relating to a hazardously-operated vehicles in the database 414 and other operation parameters or processed information associated with the system 202, the bus 102a, the vehicles 402, and/or the roadway are 404 within the database 414.

In operation, the determination module 204b or the detection and alerting 412 may perform analysis on input data or sensor data received from the sensors 410a-410n. In an example, the sensor data may indicate inactive motion of the bus 102a at a designated stop location, (such as, stopping of the bus 102a on the roadway area 404), movement of one or more passenger associated with the bus 102a (such as, onboarding or debarking of a passenger associated with the bus 102a), and activated stop indicator 408 of the vehicle. In such a case, the determination module 204b may determine crosswalk for projection.

In another example, based on sensor data indicating any proximate movement associated with the bus 102a, the determination module 204b may start monitoring traffic proximate to the bus 102a during a projection of the crosswalk on road surface of the roadway area 404. In this regard, one or more sensors from the sensors 410a-410n may be configured to capture images or video of surrounding area of the bus 102a. In such a case, the detection and alerting 412 may perform processing of the video or images of the surrounding area of a place or location of halt of the bus 102a. For example, the processing of the video or images may include, but are not limited to, segmentation, blob detection, template matching, and any other analysis of image processing known to those skilled in the art to allow the detection and alerting 412 to detect, track, and recognize other vehicles 402 and their motion within the region of interest. In this manner, the detection and alerting 412 may identify any vehicle that may be moving towards the crosswalk projected or trying to pass the halted bus 102a. It may be noted that such processes for image processing as described earlier may also be applied to other type of sensor data, such as laser point clouds, radar scans, and so on. To this end, based on sensor data proximate traffic may be monitored. Further, based on the monitoring, the detection and alerting 412 may determine one or more other traffic patterns for projection.

It may be noted that a combination of the sensors 410a-410n, the processor 204, and detection and alerting 412 may have been calibrated such that the detection and alerting 412 may reliably identify real-world positions relative to the system 202 that correspond accurately to the locations of the roadway 404, features of the roadway 404, and any and all vehicles 402 that may enter the field of view. In an example, such calibration may be performed based on map data, traffic data, probe data, and vehicle data.

The detection and alerting 412 or the determination module 204b may be configured to operate a projection control 416, which allows an image projection device 418 to project a traffic pattern. The projection control 416 may be executed as a hardware, a software, a firmware, or a combination thereof. In accordance with an example, the projection control 416 may be implemented as a software or computer-executable instructions by the processor 204. In an example, the projection control 416 may be implemented by the control module 204c. As described previously, the detection and alerting 412 may determine one or more traffic patterns for projection. Based on the determination, the detection and alerting 412 may control the projection control 416 in order to cause the image projection device 418 to project the one or more traffic patterns. In an example, the projection control 416 may activate the image projection device 418 to project the crosswalk 112 and/or other traffic patterns, such as stop sign 116, warning sign, warning message, and so forth.

To this end, the projection control 416 is configured to analyze geometry of the roadway area 404 and positions of approaching vehicle(s), for example based on map data, traffic data, probe data, vehicle data, and sensor data. In this manner, the projection control 416 may guide the image projection device 418 with regard to generation and projection of the crosswalk 112 and other traffic patterns so as to ensure that the projected traffic patterns have proper visual appearance and are projected at a desired distance. In an example, the projection control 416 may control the image projection device 418 to project the crosswalk 112 on a road surface at a pre-defined distance in a first direction. For example, the first direction of projecting the crosswalk 112 is at a front side of the bus 102a. It may be noted that producing a properly rectilinear crosswalk 112 on the roadway area 404 is not merely a matter of projecting a linear projection from a projector of the image projection device 418. Rather, the proper production and projection of the rectilinear crosswalk 112 requires geometric calculations to determine what lines and projected at what angles from the projector will result in the crosswalk 112 of appropriate appearance (or brightness).

The detection and alerting 412 may also transmit other traffic patterns, such as alert or warning traffic patterns to the projection control 416 for projection, based on monitoring of the traffic proximate to the bus 102a. In an example, the projection control 416 may control the image projection device 418 to project a warning sign, such as a stop sign 116, on a road surface. In such case, based on the vehicle(s) approaching the projected crosswalk 112, the projection control 416 may perform geometric calculations to determine a location of projection of such warning signs to ensure effectiveness of the warning signs. For example, the approaching vehicle may be approaching from different directions. In such a case, the warning sign, such as a stop sign may be projected in one or more directions. The one or more directions may be a front side of the vehicle, a first side for example, right side) of the vehicle, a second side for example, left side) of the vehicle, and/or a rear side of the vehicle. Alternatively, the approaching vehicle may be approaching from one or more particular directions. In such a case, the one or more directions for projecting the warning sign, such as the stop sign may be a direction from which the approaching vehicle is approaching.

In an example, the processor 204 may be coupled to a speaker 420. For example, the speaker 420 may be a part of the system 202 or may be separate from the system 202 but may be coupled with the system 202. In an example, the detection and alerting 412 may generate signals to the speaker 420 for proving audio warning messages or audio signals. In such a case, the detection and alerting 412 may be further configured to control or activate the speaker 420 to provide such audio warning signals. In this manner, audio warning may also be provided to vehicles approaching the projected crosswalk 112.

In certain cases, the detection and alerting 412 may determine a manner of projecting a traffic pattern, based on the sensor data. In particular, on detecting that a vehicle in approaching the crosswalk 112, or approaching the crosswalk 112 at a high speed, the detection and alerting 412 may generate instructions to cause flashing of a warning sign, change color of the warning sign, and/or increase volume of the speaker 420. For example, such manner of projecting traffic patterns and audio signals sent to the speaker 420 may be changed based on speed and distance of approaching vehicle(s). In another example, the detection and alerting 412 may determine a new traffic pattern to be generated and projected or change a manner in which the previously determined traffic pattern is being displayed. For example, the detection and alerting 412 may cause crosswalk 112 to be displayed as being flashing in red and white color, instead of a static color. Alternatively, new warning sign saying "WARNING!" may be determined for generation and projection on a pavement in the roadway area 404.

The detection and alerting 412 may also be configured to generate alerts for outside entities associated with the bus 102a or the system 202, for example, institution or school 422 associated with the bus 102a, driver 424 associated with the bus 102a, or an in-vehicle information systems 426 in the bus 102a.

In an example, the system 202 may be deployed in public bus operation. The public bus may also have to stop at multiple stop locations. Such stop locations may not have clearly marked crosswalks and thus are potentially hazardous. In accordance with an embodiment, the system 202 may be automatically or manually activated to provide guidance while crossing a road. In an example, such service may be provided to elderly passengers, specially abled passengers, or children that may be travelling via the public busses and may be attempting to board or deboard the bus. In addition, in such case, warning signs indicating elderly person or disabled person crossing a road may be projected to help in crossing the road.

In another example, the system 202 may be deployed for providing temporary crosswalk. For example, during construction or emergencies, it is common for regular crossing areas to be disabled or difficult to access. In such cases, the system 202 may be deployed on roads. For example, the system 202 may be coupled with existing traffic light infrastructure on the road. Subsequently, the system 202 may determine when to project the crosswalk and further provide clear, unambiguous, safe, and monitored crosswalks that may be synchronized with traffic patterns and could be customized for usage.

FIG. 5 illustrates an example method 500 for user guidance, in accordance with an example embodiment. More, fewer, or different steps may be provided. The method 500 is explained in conjunction with FIGS. 1 and 2. The method 500 is initialized at START block.

At 502, a determination is performed to check whether the stop indicator 108 is activated or not. In an example, the determination module 204b may determine whether the stop indicator 108 is activated or not based on received sensor data. In an example, the stop indicator may be activated manually or automatically. Subsequently, a sensor associated with the bus 102a and the stop indicator 108 may generate sensor data to indicate activation of the stop indicator 108. The activation of stop indicator 108 may indicate halt of the bus 102a for loading and/or unloading. For example, the bus 102a may halt on the road 104 having two lanes, depicted as an up lane 104a and a down lane 104b in FIG. 1. If the stop indicator 108 is not active, the method 500 returns to START to continue detecting until the stop indicator 108 is active.

At 504, the system 202 is activated to perform processing. In an example, the processor 204 may obtain sensor data and/or other data to perform various operations associated with the system 202. The sensor data may include, but is not limited to, state of operation of the bus 102a, and vehicle or traffic data associated with surrounding area of the bus 102a. In an example, the processor 204 may also obtain other data, such as map data, traffic data, probe data, and vehicle data associated with the bus 102a and/or the road 104.

At 506, the system 202 may project a crosswalk. In this regard, the system 202 may perform processing of the obtained data. The system may then project the crosswalk 112. In an example, based on activation of the stop indicator 108 indicating boarding or debarking the bus 102a, and/or other data indicating the pedestrian 106 crossing the road 104, a determination for projection of the crosswalk 112 may be made. Subsequently, based on road geography and traffic, an appropriate location and distance of projecting the crosswalk 112 may be ascertained. Thereafter, the crosswalk 112 may be projected. In an example, the crosswalk may be projected at a front side or in front of the bus 102a. In addition, other traffic patterns, for example, default symbols that may have been determined At 508, the system 202 may monitor traffic proximate to the bus 102a. In this regard, sensor data may be acquired from sensors onboard the bus 102a and/or other sensors in vicinity of the stop location of the bus 102a. In an example, based on sensor data indicating the proximate movement associated with the vehicle, the processor 204 may monitor traffic proximate to the bus 102a during the projection of the crosswalk 112 on the road surface of the road 104.

At 510, the system 202 determines whether a vehicle is approaching. The vehicle, such as the vehicle 102c and the vehicle 102d may be approaching towards the projected crosswalk 112 or try to cross the stopped bus 102a. The processor 204 may monitor the traffic proximate to the bus 102a based on the sensor data relating to the bus 102a and other vehicles proximate to the bus 102a. On determining that one or more vehicle may be approaching towards the projected crosswalk 112, the method 500 may move to 512.

At 512, a determination is made whether the approaching vehicle is hazardous or not. For example, the processor 204 may determine an approaching vehicle as hazardous when the approaching vehicle is approaching at a high speed, high velocity, high acceleration, very small distance from the projected crosswalk 112, and the like. Such conditions of the approaching vehicle, if unchanged, may lead to intruding upon the crosswalk 112. In an example, while the crosswalk 112 is assumed to be the area of exclusion (empty area on the road 104), the system 202 may be configured to monitor traffic at other different area or multiple areas, for example, sides of the bus 102a to detect any vehicle passing the stopped bus 102a from rear.

At 514, if the approaching vehicle is determined to be hazardous, the system 202 may activate an alert mode. In an example, the processor 204 may determine one or more traffic pattern to alert the driver of the approaching vehicle. In an example, the traffic pattern may be a warning sign, a stop sign, a warning message, and so forth.

Once the alert mode is activated, the warning sign, such as the stop sign may be projected on the road 104.

In addition, at 516, the system may also activate other alerts, for example, activate the system 202 to record the sensor data of the bus 102a. Based on the alert provided using one or more traffic patterns and the recording of sensor data, the system 202 may check whether no vehicle is approaching the crosswalk 112, if the approach is hazardous, if the alert mode is on, and if the warning sign is off.

Thereafter, at 518, a determination is made if the alert mode or warning sign is still active, i.e., the stop sign is on or not. Accordingly, the system 202 may determine if any vehicle is approaching the projected crosswalk 112 or trying to cross the bus 102a, or not. Based on the determination, the system may continue to monitor the traffic proximate to the bus 102a until the crosswalk 112 is being projected or go to sleep at 520.

FIG. 6 illustrates an example method 600 for providing user guidance while crossing a road, in accordance with an example embodiment. Fewer, more, or different steps may be provided.

At 602, sensor data may be obtained from one or more sensors onboard a vehicle. In an example, the vehicle may be a school bus. The sensor data may be associated with a state of operation of the vehicle, and proximate movement associated with the vehicle. In an example, the sensor data may indicate, for example, motion of the vehicle (stopped, halted, moving, etc.), state of operation (stop indicator is on or not), and traffic information relating to vehicles that are proximate to the vehicle when the vehicle is stopped.

At 604, one or more traffic patterns for projection is determined, based on the sensor data. In an example, other data, such as map data, traffic data, vehicle data, probe data, may also be fused with the sensor data to determine the determine one or more traffic pattern for projection. In an example, the sensor data may indicate inactive motion of the vehicle at a designated stop location, movement of one or more passenger associated with the vehicle, and activated stop indicator of the vehicle. In such a case, the crosswalk may be determined for projection. In another example, the sensor data may indicate an approaching vehicle towards a projected crosswalk. In such a case, a warning sign or a warning message may be determined for projection.

At 606, an image projection device is controlled to project the one or more traffic patterns in one or more direction of the vehicle. In an example, the image projection device may include a plurality of projectors. The plurality of projectors being mounted on one or more sides of the vehicle. In an example, a first projector mounted on a front side of the vehicle, a second projector may be mounted on a first side (for example, right side) of the vehicle, a third projector may be mounted on a second side (for example, left side) of the vehicle, and a fourth projector may be mounted on a rear side of the vehicle. In such a case, the first projector may be controlled to the crosswalk on the road surface at a predetermined distance for a pre-defined time period, or until a pedestrian safely crosses the road. Further, on determining the approaching vehicle, the second projector, third projector, and/or the fourth projector may be controlled to project one or more warning signs. The warning sign may be a stop sign, a warning message, and so forth. In an example, brightness, color, flashing intensity, etc. of the warning sign may be varied based on the approaching vehicle to effectively alert the driver of the approaching vehicle.

Accordingly, blocks of the methods 500 and 600 support combinations of means for performing the specified functions and combinations of operations for performing the specified functions. It will also be understood that one or more blocks of the methods 500 and 600, and combinations of blocks in the methods 500 and 600, can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 204 and/or a device or circuit for executing instructions or executing an algorithm for processing information as described above.

On implementing the methods 500 and 600 disclosed herein, the end result generated by the system 202 is a tangible safety guidance for crossing a road. The projection of the crosswalk and other warning signs is crucial to avoid any fatalities in road incidents, specially, on roads having no markings.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for user guidance, the system comprising: an image projection device configured to project traffic patterns on a surface; at least one non-transitory memory configured to store computer program code; and a processor configured to execute the computer program code to control operation of the image projection device, wherein the processor is configured to: obtain sensor data from one or more sensors onboard a vehicle, the sensor data being associated with a state of operation of the vehicle, and proximate movement associated with the vehicle; based on the sensor data indicating at least one of: an inactive motion of the vehicle at a designated stop location, movement of one or more passengers associated with the vehicle, and an activated stop indicator of the vehicle, determine one or more traffic patterns for projection, of which one of the one or more traffic patterns is a crosswalk; and control the image projection device to project the one or more traffic patterns of which one is a crosswalk in one or more direction associated with the vehicle for providing the user guidance, and in which the one or more traffic patterns is projected on a road surface at a pre-defined distance from the vehicle in a first direction.

2. The system of claim 1, wherein the first direction of projecting the crosswalk is at a front side of the vehicle.

3. The system of claim 1, wherein the activated stop indicator indicates halt of the vehicle when a passenger associated with the vehicle is performing at least one of: getting on the vehicle and getting off the vehicle.

4. The system of claim 1, wherein the processor is further configured to: based on sensor data indicating the proximate movement associated with the vehicle, monitor traffic proximate to the vehicle during the projection of the crosswalk on the road surface.

5. The system of claim 4, wherein the processor is further configured to: based on the monitoring, determine an approaching vehicle during the projection of the crosswalk on the road surface; based on the approaching vehicle, determine a stop sign for projection; and control the image projection device to project the stop sign on the road surface in the one or more directions.

6. The system of claim 5, wherein the one or more directions for projecting the stop sign is at least one of: a front side of the vehicle, a first side of the vehicle, a second side of the vehicle, and a rear of the vehicle.

7. The system of claim 5, wherein the one or more directions for projecting the stop sign is a direction from which the approaching vehicle is approaching.

8. The system of claim 1, wherein the traffic patterns being projected by the image projection device include at least one of: a crosswalk, a stop sign, a slow sign, one or more traffic sign, and one or more text patterns.

9. The system of claim 1, wherein the image projection device comprises a plurality of projectors, the plurality of projectors being mounted on one or more sides of the vehicle.

10. The system of claim 9, wherein the plurality of projectors comprise: a first projector mounted on a front side of the vehicle; a second projector mounted on a first side of the vehicle; a third projector mounted on a second side of the vehicle; and a fourth projector mounted on a rear side of the vehicle.

11. The system of claim 9, wherein the plurality of projectors are configured to project different traffic patterns.

12. A method for user guidance, the method comprising: obtaining sensor data from one or more sensors onboard a vehicle, the sensor data being associated with a state of operation of the vehicle, and proximate movement associated with the vehicle; based on the sensor data indicating at least one of: an inactive motion of the vehicle at a designated stop location, movement of one or more passenger associated with the vehicle, and an activated stop indicator of the vehicle, determining one or more traffic patterns for projection of which one of the traffic patterns is a crosswalk; and controlling an image projection device to project the one or more traffic patterns, of which at least one is a crosswalk, in one or more direction associated with the vehicle for providing the user guidance and the one or more traffic patterns is projected on a road surface at a pre-defined distance in a first direction.

13. The method of claim 12, further comprising: based on sensor data indicating the proximate movement associated with the vehicle, determining an approaching vehicle during the projection of the crosswalk on the road surface; based on the approaching vehicle, determining a stop sign for projection; and controlling the image projection device to project the stop sign on the road surface in the one or more directions.

14. The method of claim 13, wherein the image projection device comprises a plurality of projectors, the plurality of projectors being mounted on one or more sides of the vehicle, the method further comprising: controlling a first projector mounted on a front side of the vehicle to project the crosswalk on the road surface at a predetermined distance for a pre-defined time period; controlling a second projector mounted on a first side of the vehicle to project the stop sign; controlling a third projector mounted on a second side of the vehicle to project the stop sign; and controlling a fourth projector mounted on a rear side of the vehicle to project the stop sign.

15. A computer programmable product comprising a non-transitory computer readable medium having stored thereon computer executable instructions, which when executed by one or more processors, cause the one or more processors to carry out operations for user guidance, the operations comprising: obtaining sensor data from one or more sensors onboard a vehicle, the sensor data being associated with a state of operation of the vehicle, and proximate movement associated with the vehicle; based on the sensor data, determining one or more traffic patterns for projection, of which at least one is a crosswalk; based on the sensor data indicating the proximate movement associated with the vehicle, determining an approaching vehicle during the projection of the crosswalk on the road surface; based on the determination of the approaching vehicle, determining a stop sign as an additional pattern for projection; and controlling an image projection device to project the one or more traffic patterns in one or more direction of the vehicle for providing the user guidance, and in which the one or more traffic patterns are projected on a road surface at a pre-defined distance in a first direction; and the stop sign is projected on the road surface in the one or more directions.

16. The computer programmable product of claim 15, wherein the image projection device comprises a plurality of projectors, the plurality of projectors being mounted on one or more sides of the vehicle, the operations further comprising: controlling a first projector mounted on a front side of the vehicle to project the crosswalk on the road surface at a predetermined distance for a pre-defined time period; and controlling a second projector mounted on a first side of the vehicle to project the stop sign, wherein the first side of the vehicle is in a direction from which the approaching vehicle is approaching.

* * * * *